United States Patent [19]

Barnett

[11] Patent Number: 4,770,190

[45] Date of Patent: Sep. 13, 1988

[54] CLEANING SHOE SCREEN FOR AN AGRICULTURAL COMBINE HAVING READILY REPLACEABLE LOUVERS

[75] Inventor: Jerry G. Barnett, Orion, Ill.

[73] Assignee: Deere & Company, Moline, Ill.

[21] Appl. No.: 50,973

[22] Filed: May 15, 1987

[51] Int. Cl.$^4$ .............................................. A01F 12/32
[52] U.S. Cl. ................................... 130/27 Z; 130/24; 209/394
[58] Field of Search ................... 130/24, 272; 209/394

[56] References Cited

U.S. PATENT DOCUMENTS

| | | | |
|---|---|---|---|
| 579,793 | 3/1897 | Ditch | 209/394 |
| 682,670 | 9/1901 | Closz | 209/394 |
| 784,828 | 3/1905 | Armstrong | 209/394 |
| 925,623 | 6/1909 | Closz | 209/394 |
| 1,288,213 | 12/1918 | Salonen | 209/394 |
| 2,253,296 | 8/1941 | Holtzman | 209/394 |
| 2,413,382 | 12/1946 | Sargent et al. | 209/394 |
| 3,385,438 | 5/1968 | Fisher | 209/394 |
| 4,502,493 | 3/1985 | Jones et al. | 130/24 |

Primary Examiner—Paul J. Hirsch

[57] ABSTRACT

A cleaning shoe of an agricultural combine having a chaffer screen and sieve screen which are provided with readily replaceable louvers. Both the chaffer and sieve have rectangular frames across which extend laterally arranged louvers. The louvers are held in place by a readily removable adjustment bar which is used for adjusting the opening side defined by the louvers. The adjustment bar is slidably mounted in a U-shaped member having inwardly turned lips that together with a retainer strip and a spring lock the adjustment bar into the frame thereby holding the louvers in place. By removing the retainer strip and spring, the adjustment bar can be removed and the louver replaced.

16 Claims, 2 Drawing Sheets

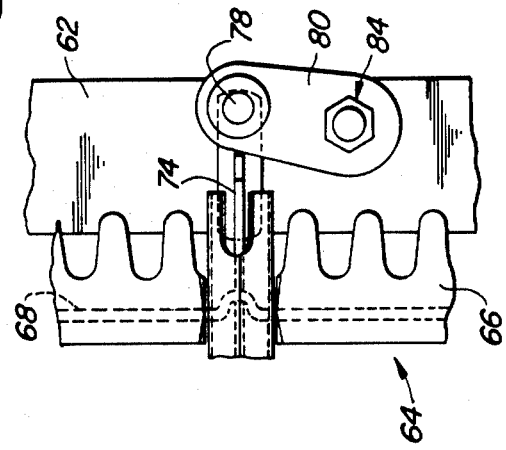
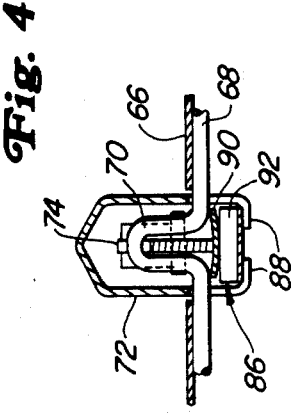
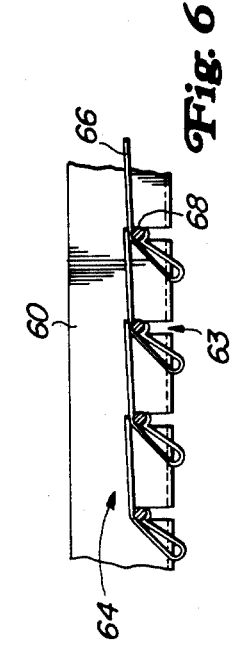
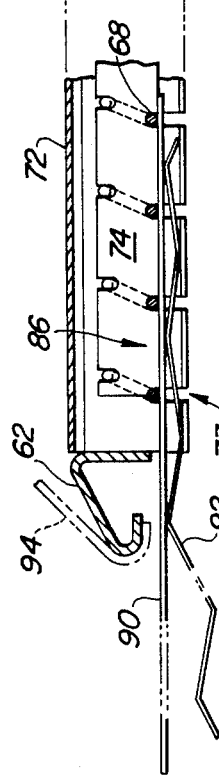

CLEANING SHOE SCREEN FOR AN AGRICULTURAL COMBINE HAVING READILY REPLACEABLE LOUVERS

BACKGROUND OF THE INVENTION

1. Field of the Invention

The invention is directed to the cleaning shoe screens of an agricultural combine, wherein the cleaning shoe is provided with a chaffer screen and a sieve screen having readily replaceable louvers.

2. Description of the Prior Art

In agricultural combines, a harvesting platform harvests a crop and directs it through a feeder house to a threshing and separating assembly. The separating assembly is provided with a cleaning shoe for separating the chaff and unthreshed tailings from the grain.

The conventional cleaning shoe configuration comprises a chaffer screen and a sieve screen, which are of similar construction. A blower is used for directing an air blast longitudinally and upwardly to the underside of the screens. The screens are oscillated or reciprocated so that material located thereon migrates to the rear of the units. Clean grain passing through the chaffer and sieve are received by a clean grain auger which directs the grain to a storage tank. Tailings, that is unthreshed heads of grain and other heavier trash, pass through the chaffer screen and are then directed by the sieve screen to a tailings auger which returns the tailings to the threshing means. Lighter trash and chaff are directed out the rear of the combine by the air blast from the blower.

The overall structure and function of the conventional cleaning shoe is well known in the art. Such cleaning shoes can be used with conventional combines having a transverse threshing cylinder and concave, and straw walkers, or a rotary axial flow combine. The screens are provided with openings through which the grain passes. These openings can either be adjustable or fixed. The openings are defined by louvers extending laterally across the unit. Adjacent louvers overlap to define the openings by undulating structure of each louver. Sometimes individual louvers become broken and need to be replaced. Typically, either the whole chaffer screen or sieve screen would be discarded because of the difficulty in replacing the louver. The present invention is directed to a chaffer and/or sieve screen in which the louvers are readily replaceable.

SUMMARY OF THE INVENTION

The chaffer and/or sieve screen of the cleaning shoe comprises a rectangular frame having adjustable louvers which define the openings in the cleaning shoe. The frame is provided with receiving notches to which the louvers are laterally secured. A central U-shaped member is mounted to the frame and forms a mounting means for an adjustment bar used in adjusting the size of the openings defined by the louvers. The adjustment bar is also provided with receiving notches for receiving the louvers. The adjustment bar is longitudinally slidable in the U-shaped member and is used to move a crank arm formed on the louver for pivoting the louver towards or away from adjacent louvers thereby controlling opening size.

The adjustment bar forms a releaseable locking means for locking the adjustable louvers in the frame. More specifically, the receiving notches in the adjustable bar are located on its top edge, whereas the receiving notches on the frame are located on the frame's bottom edge. In this way, the louvers are sandwiched between the adjustment bar and the frame, locking them into the frame. The adjustment bar is held in place by the mounting means comprising inwardly extending lips of the U-shaped member which hold a spring biased retaining strip. The spring rests on the lips of the U-shaped member and pushes the retaining strip against the adjustment bar.

To replace a louver, the chaffer and/or sieve screen is removed from the combine and turned onto its top. The spring and retainer strip are slidably removed and the adjustment bar pivoted away from the louvers. The damaged louver can then be replaced. After the damaged louver is replaced, the adjustment bar is remounted so that the receiving notches mate with the louvers. The retainer strip and spring are slidably refitted and the screen remounted into the combine.

BRIEF DESCRIPTION OF THE DRAWINGS

FIG. 3 is a cross sectional view taken along line 3—3 in FIG. 2.

FIG. 4 is a cross sectional view taken along line 4—4 in FIG. 3.

FIG. 5 is a top view of the adjustment link structure.

FIG. 6 is a side view of a side member of the frame.

DETAILED DESCRIPTION

Figure 1:
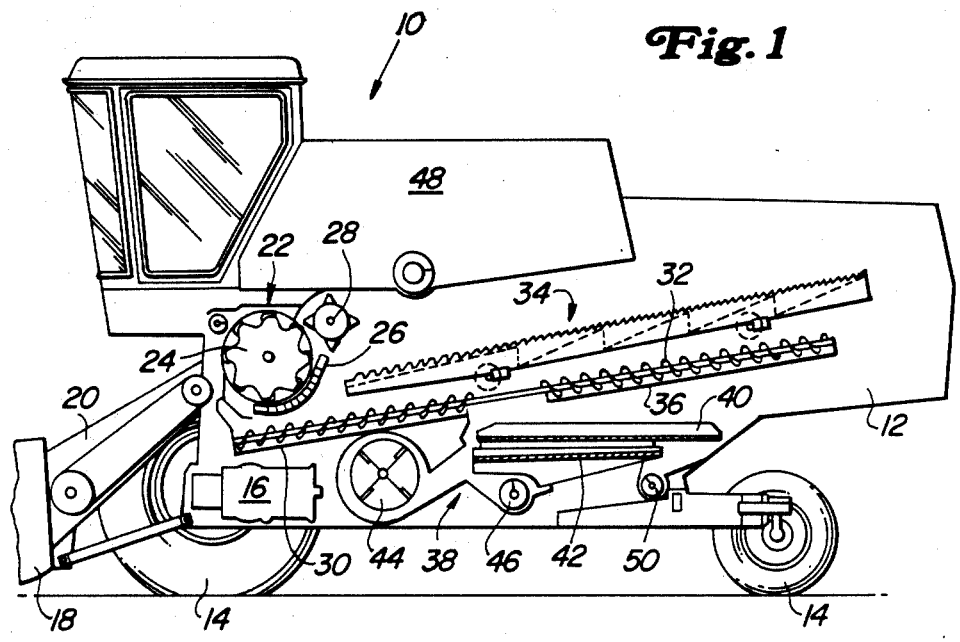
FIG. 1 is a semi-schematic side view of a self-propelled agricultural combine.

FIG. 1 illustrates a self-propelled combine 10 having supporting structure 12 and ground engaging wheels 14. The combine is provided with an engine (not shown) driving motor 16 for rotating driving wheels 14 and powering the operating means. An agricultural crop is harvested by harvesting platform 18 and directed by feeder house 20 to threshing means 22. The threshing means comprises a transverse threshing cylinder 24 and associated concave 26 together with beater 28. Grain and chaff fall from the threshing means onto pan 30 having transport auger 32. Straw and residual grain are then directed to oscillating straw walkers 34 from which the straw is directed out of the combine. The residual grain falls onto pan 36 where it also comes into contact with auger 32 which transports the material located thereon to cleaning shoe 38.

The cleaning shoe comprises oscillating or reciprocating chaffer screen 40 and sieve screen 42. Blower 44 directs an air stream upwardly against the underside of the screen, blowing the chaff out of the rear of the combine. Grain passing through the chaffer and sieve are directed to clean grain auger 46 which transports the grain to storage compartment 48, whereas tailings are directed from the sieve to tailings auger 50 which reintroduces the tailings to the threshing means.

Figure 2:
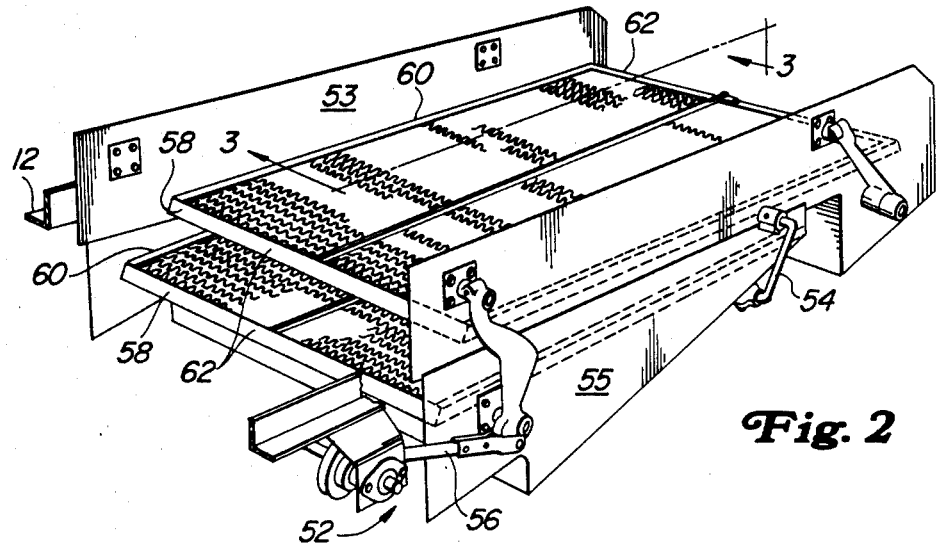
FIG. 2 is a perspective view of a cleaning shoe of an agricultural combine.

FIG. 2 illustrates a perspective view of a reciprocating cleaning shoe which is mounted to supporting structure 12 by hangers 52. Upper shoe 53 holding the chaffer screen and lower shoe 55 holding the sieve screen are interconnected by hangers 54. The upper and lower sides are operatively coupled to pitman 56 for reciprocating the assembly. It should be noted that although the present invention is being discussed in regards to a reciprocating cleaning shoe it would be suitable to use it with other cleaning shoe arrangements, such as a shaker, or cascading cleaning shoe.

Both the chaffer and sieve screens are provided with an elongated rectangular frame 58 having longitudinal side members 60 and lateral front and rear members 62. Each of the side members are provided with a plurality of receiving notches 63 on their bottom edge. Located between the side members of the frame are a plurality of louvers 64 each louver having a sheet metal undulating plate 66 and a mounting rod 68. The ends of the mounting rod are pivotally mounted in receiving notches 63 of side members 60. The mounting rod has U-shaped central bend 70 which formed a crank arm for pivoting the louvers about the rod.

Centrally mounted in the frame is U-shaped member 72 having receiving notches 73. Member 72 is used to receive adjustment bar 74 having a plurality of receiving notches 76 along its top edge for receiving the apex of bend 70. The adjustment bar is slidably mounted in the U-shaped member for moving the crank arms of the louvers. The adjustment bar is provided with an upstanding pin 78 that is operatively coupled to adjustment link 80. Link 80 is bolted to rear frame member 62 by bolt assembly 84. By pivoting link 80, the adjustment bar is moved back and forth in the U-shaped member thereby pivoting the louvers. The link is held in place by tightening bolt assembly 84.

The adjustment bar is held in the U-shaped member by mounting means 86. The mounting means comprises inwardly extending lips 88 of U-shaped member 72, retainer strip 90 and Z-shaped spring 92. The adjustment bar is thin enough to fit through the opening defined by lips 88, therefore, it must be held in place by the retainer strip. The retainer strip is forced against the underside of the adjustment bar by the Z-shaped spring which also contacts the inwardly extending lips of the U-shaped member.

To replace a louver, adjustment link 80 is removed from the adjustment bar. Other bolt assemblies that coupled the chaffer to rear transverse mounting bracket 82 are loosened or removed so that the chaffer or sieve can be lifted from the combine. The chaffer is then turned over and placed upside down on a work surface. The spring and retainer strip are then removed by sliding them from one end of the U-shaped member. The adjustment bar is pivoted out of U-shaped member 72 and the appropriate louver replaced. The adjustment bar is replaced together with the mounting means and the chaffer or sieve screen reinserted and mounted in the combine.

The chaffer screen is supported on front and rear transverse brackets 94 and 82, respectively, that extend between the side walls of the upper shoe 53. The sieve screen is similarly mounted to transverse brackets extending across lower shoe 55. The rear bracket which is located to the rear of the combine is provided with bolting assemblies for securing the chaffer to the mounting bracket. These bolting assemblies engage rear member 62 and fasten it to the bracket. A similar bolting arrangement is not present at bracket 94 because it would be difficult to access the bolts in a removal operation. The chaffer screen is solely supported on these brackets and no side supporting brackets are located on the sidewalls of the shoe. However, it maybe convenient to mount guide brackets on the sidewalls to facilitate installation and removal of the chaffer.

Although the invention has been described in context of the cleaning shoe chaffer screen, it equally applies to a sieve screen having the identical overall structure except for the arrangement and configuration of the louvers. It should be noted that it may be desirable to limit the overall width of the chaffer screen or sieve screen to facilitate their removal of reducing the individual units weight.

The present invention should not be limited by the above-described embodiment, but should be limited solely by the claims that follow.

I claim:

1. A cleaning shoe screen for an agricultural combine for separating chaff and unthreshed tailings from grain, the cleaning shoe comprising:

a longitudinally extending frame adapted and constructed to be mounted in an agricultural combine, the frame is provided with a plurality of receiving notches and a longitudinally mounted U-shaped member having laterally extending lips extending longitudinally along the U-shaped member;

a plurality of adjustable louvers are laterally secured in the receiving notches of the frame, the louvers defining openings through which the grain falls into a receiving means;

an elongated adjustment bar is removably longitudinally mounted in the U-shaped member and is used for adjusting the openings defined by the adjustable louvers, the adjustment bar when mounted to the frame forms a locking means for locking the adjustable louvers in the frame; and means cooperating with the laterally extending lips of the U-shaped member for removably mounting the adjustment bar to the frame.

2. A cleaning shoe screen as defined by claim 1 wherein the means further comprises a longitudinally extending filler strip that is releasably mounted in the U-shaped member and cooperates with the laterally extending lips for removably mounting the adjustment bar to the frame.

3. A cleaning shoe screen as defined by claim 2 wherein the means further comprises a biasing means that biases the filler strip away from the laterally extending lips into contact with the adjustment bar.

4. A cleaning shoe screen as defined by claim 3 wherein the biasing means comprises a Z-shaped spring.

5. A cleaning shoe screen as defined by claim 3 wherein the adjustment bar is longitudinally slidably mounted in the U-shaped member and is provided with a pin that is coupled to an adjustment link, the adjustment link is pivotally mounted to the frame and is used for sliding the adjustment bar in the U-shaped member for adjusting the openings defined by the adjustable louvers.

6. A cleaning shoe screen as defined by claim 5 wherein the frame is rectangular having at least two longitudinal side members and two lateral front and back members, the front and back members are adapted and constructed to be supported by lateral support members extending between two movably plates, and the U-shaped member is centrally mounted in the frame.

7. An agricultural combine for harvesting a crop from a field and threshing and separating the harvested grain from the harvested straw and chaff, the combine comprising:

a supporting structure having ground engaging means for supporting the supporting structure above the ground;

a harvesting structure extending from the supporting structure which is used to harvest a crop from a field;

a threshing means located on the supporting structure for threshing the harvested crop to separate the harvested grain from the harvested straw;

separating means located on the supporting structure to separate the harvested grain from the harvested straw and chaff, the separating means comprising a cleaning shoe screen for separating chaff and unthreshed tailings from grain, the cleaning shoe screen comprising a longitudinally extending frame adapted and constructed to be mounted in an agricultural combine, the frame is provided with a plurality of receiving notches and a longitudinally mounted U-shaped member having laterally extending lips extending longitudinally along the U-shaped member, a plurality of adjustable louvers are laterally secured in the receiving notches of the frame, the louvers defining openings through which the grain falls into a receiving means, and an elongated adjustment bar is removably longitudinally mounted in the U-shaped member and is used to adjust the openings defined by the adjustable louvers, the adjustment bar when mounted to the frame forms a locking means for locking the adjustable louvers in the frame, and means cooperating with the laterally extending lips of the U-shaped member for removably mounting the adjustment bar to the frame.

8. A combine as defined by claim 1 wherein the means further comprises a longitudinally extending filler strip that is releasably mounted in the U-shaped member and cooperates with the laterally extending lips for removably mounting the adjustment bar to the frame.

9. A combine as defined by claim 8 wherein the means further comprises a biasing means that biases the filler strip away from the laterally extending lips into contact with the adjustment bar.

10. A combine as defined by claim 9 wherein the biasing means comprises a Z-shaped spring.

11. A combine as defined by claim 9 wherein the adjustment bar is longitudinally slidably mounted in the U-shaped member and is provided with a pin that is coupled to an adjustment link, the adjustment link is pivotally mounted to the frame and is used for sliding the adjustment bar in the U-shaped member for adjusting the openings defined by the adjustable louvers.

12. A combine as defined by claim 11 wherein the frame is rectangular having at least two longitudinal side members and two lateral front and back members, the front and back members are adapted and constructed to be supported by lateral support members extending between two movable plates that are movably supported on the support structure of the combine.

13. A combine as defined by claim 12 wherein the U-shaped member is laterally centrally mounted in the rectangular frame.

14. A combine as defined by claim 13 further comprising a propulsion means for driving the ground engaging means for moving the supporting structure across a field.

15. A chaffer screen of a cleaning shoe for an agricultural combine for separating chaff from grain, the chaffer comprising:

a longitudinally extending frame adapted and constructed to be mounted in an agricultural combine, the frame is provided with a plurality of receiving notches and a longitudinally mounted U-shaped member having laterally extending lips extending longitudinally along the U-shaped member;

a plurality of adjustable louvers are laterally secured in the receiving notches of the frame, the louvers defining openings through which the grain falls into a receiving means;

an elongated adjustment bar is removably longitudinally mounted in the U-shaped member and is used to adjust the openings defined by the adjustable louvers, the adjustment bar when mounted to the frame forms a locking means for locking the adjustable louvers in the frame; and means cooperating with the laterally extending lips of the U-shaped member for removably mounting the adjustment bar to the frame.

16. A sieve screen of a cleaning shoe for an agricultural combine for separating unthreshed tailings from grain, the sieve comprising:

a longitudinally extending frame adapted and constructed to be mounted in an agricultural combine, the frame is provided with a plurality of receiving notches and a longitudinally mounted U-shaped member having laterally extending lips extending longitudinally along the U-shaped member;

a plurality of adjustable louvers are laterally secured in the receiving notches of the frame, the louvers defining openings through which the grain falls into a receiving means;

an elongated adjustment bar is removably longitudinally mounted in the U-shaped member and is used to adjust the openings defined by the adjustable louvers, the adjustment bar when mounted to the frame forms a locking means for locking the adjustable louvers in the frame; and means cooperating with the laterally extending lips of the U-shaped member for removably mounting the adjustment bar to the frame.

* * * * *